April 18, 1939.  J. KIRCHHOF  2,155,195
ADJUSTABLE THRUST BEARING FOR VALVE SPRINGS
Filed Oct. 27, 1936
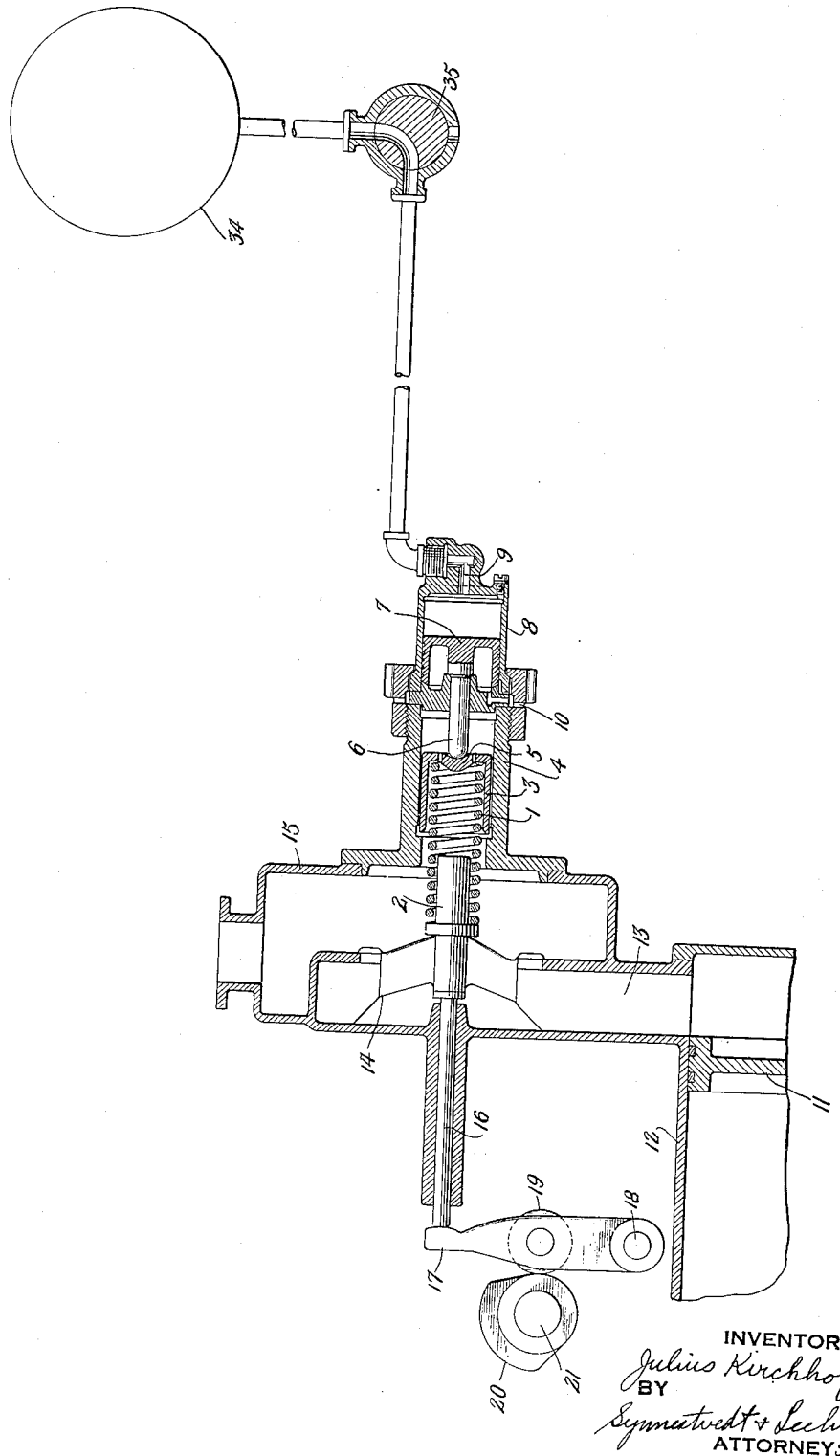
INVENTOR
Julius Kirchhof
BY
Synnestvedt & Lechner
ATTORNEYS Patented Apr. 18, 1939

2,155,195

UNITED STATES PATENT OFFICE 2,155,195

ADJUSTABLE THRUST BEARING FOR VALVE SPRINGS

Julius Kirchhof, Paris, France, assignor to firm Societe d'Exploitation des Procedes Dabeg, Paris, France Application October 27, 1936, Serial No. 107,813
In France October 28, 1935

2 Claims. (Cl. 137—111)

My invention relates to an adjustable thrust bearing for valve springs.

The distributing valves for steam and like engines (the opening control of which is effected by means of cams of any shape and of any convenient arrangement), generally speaking, are provided with return springs. Such springs must have a very high strength because of the dimensions of the valves and of the necessary high speeds of operation. It follows that when said valves or their controlling members are to be operated, for example to effect reversing (this adjustment being made while the machine is not operating), a very special effort must be applied to overpower the compression force of the springs.

According to my invention, which overcomes the above difficulty, an adjustable thrust bearing or reaction abutment is provided for each spring and is equipped with a controlling member, operating either directly or indirectly, such as a piston or the like which may be displaced in a convenient chamber, such as a cylinder, in which it is subjected to a pressure (resilient or otherwise) higher than that which is exertable by the associated valve spring, so as to permit said spring to be distended by virtue of the temporary relieving of the spring pressure (either manually or automatically), thus rendering easier the control of said valve while securing the convenient maintenance of the compression force of the springs during the normal operation of the machine.

How the foregoing is accomplished is illustrated in the accompanying drawing showing, by way of example, an embodiment of the preferred constructional form of the adjustable thrust bearing of my invention, said embodiment illustrating the application of a thrust bearing to a valve device of a locomotive of a known type.

In the drawing, the coil spring 1, which acts at one end upon a socket 2 adapted to be associated with an end of the valve stem 16, serves to control the closure of the valve 14. This valve works in the chest 15 having a passage 13 communicating with cylinder 12 in which one of the pistons of the locomotive 11 is mounted. The opening movement of the valve may be effected by means of a cam 20 mounted on shaft 21, the cam bearing on a roller or follower 19 carried by a lever which is pivoted at 18, the free end 17 of which is adapted to abut an end of the valve stem 16. The foregoing valve and cam actuating mechanism is of a general type known in this art and is described only briefly since the specific features thereof form no part of the present invention per se.

The end of the valve closing spring 1 remote from the valve 14 is held in a cup 3, constituting a thrust bearing or reaction abutment for the spring which is slidably mounted in a chamber 4 of any convenient arrangement.

A central part 5 of the cup 3 receives the end of the stem 6 of a piston 7 located in cylinder 8 which communicates through a port 9 with a convenient source of any fluid under pressure shown, by way of example, at 34. A member, such as a cock, valve or the like, illustrated at 35, may be operated from the operator's post of the machine, is located in the pipe 15 which feeds cylinder 8 in such a manner as, in one position, to cut off the communication of said cylinder 8 with the source of fluid under pressure and, in another position, to bring said cylinder 8 into communication with the atmosphere. Said cock or the like may be connected by any convenient means with the other control organs for the machine, such for example as the steam governor, or reversing gear, in order to obtain wholly or partially automatic operation.

Convenient packings are provided around piston 7 and also around the rod 6. A drain port 10, provided with a convenient obturator, is located at the end of cylinder 8 remote from port 9.

During normal operation, the valve is, of course, loaded by spring 1, the member or socket 2 engaging the valve stem and thus receiving the cam thrust during actuation of the valve. The piston 7 is kept rigidly in the position shown in the drawing by the pressure existing in cylinder 8, the whole device thus operating as if spring 1 were held on the end of a stationary stem.

The fluid pressure which acts in cylinder 8 is, of course, sufficient for constantly keeping the effort exerted by said pressure upon piston 7 higher than the highest possible compression force of spring 1.

When it is desired to adjust the mechanism so as to vary the operation of the valves, for example through cams, the communication between each cylinder 8 and the corresponding source of fluid under pressure is cut off, this being accomplished by movement of valve 35 to its position in which the cylinder 8 is vented. Thereby the cylinders are brought into communication with the atmosphere, and this causes a fall in pressure to take place in said cylinders. Each piston 7 is thus forced by its spring 1 towards the end of cylinder 8, from a position in which said spring 1 possesses only a very small or no compression force, so that the member which controls the valves may be displaced easily and with small effort.

The fluid which is used for keeping piston 7 in the position providing compression of spring 1 could be steam, in the case of a steam engine, but said fluid can also be any fluid under pressure, resilient or otherwise, and the cylinder 8 either may be kept in constant communication with the source during operation of the engine, or said cylinder may be isolated by adjustment of some other convenient device.

While I have illustrated only a single form of mechanism embodying the invention, it will be understood that modifications may be made without departing from the spirit of the invention.

My invention relates to distributing devices provided with valves either of horizontal, vertical or inclined type, for steam engines designed for locomotives, naval engines or the like.

What I claim is:—

1. In actuating and controlling mechanism for a steam engine distribution valve having a controllable cut-off cam operating means, a member receiving the cam thrust during operation thereof, a valve closing spring associated with said member, a reaction abutment for said spring mounted for movement in the direction of reaction of the spring, and means normally retaining the abutment in a position to maintain the valve closing force of the spring, said means being releasable to relieve the pressure of the spring on the valve.

2. In actuating and controlling mechanism for a steam engine distribution valve having a controllable cut-off cam operating means, a member receiving the cam thrust during operation thereof, a valve closing spring associated with said member, a reaction abutment for said spring mounted for movement in the direction of reaction of the spring, and means normally retaining the abutment in a position to maintain the valve closing force of the spring, said means including a fluid pressure piston and cylinder device associated with the abutment and operative to maintain the valve closing force of the spring upon admission of fluid to the cylinder of said device and upon exhaust of fluid from the cylinder to relieve the pressure of the spring on the valve.

JULIUS KIRCHHOF.